(12) United States Patent
Rajpure et al.

(10) Patent No.: US 8,910,149 B2
(45) Date of Patent: Dec. 9, 2014

(54) ON-DEMAND OR INCREMENTAL REMOTE DATA COPY

(75) Inventors: Dattatraya Rajpure, Redmond, WA (US); Tahsin Erdogan, Redmond, WA (US); Thomas Bouldin, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 812 days.

(21) Appl. No.: 12/978,449

(22) Filed: Dec. 24, 2010

(65) Prior Publication Data

US 2012/0167074 A1 Jun. 28, 2012

(51) Int. Cl.
*G06F 9/445* (2006.01)
*H04L 29/08* (2006.01)

(52) U.S. Cl.
CPC .................................. *H04L 67/06* (2013.01)
USPC ............................ 717/176; 717/177; 717/178

(58) Field of Classification Search
CPC ............... G06F 8/60; G06F 8/61; G06F 8/63; H04L 29/08981
See application file for complete search history.

(56) References Cited

U.S. PATENT DOCUMENTS

| | | | |
|---|---|---|---|
| 5,287,453 A | 2/1994 | Roberts | |
| 7,523,452 B1 * | 4/2009 | Kamity et al. | 717/178 |
| 7,546,594 B2 * | 6/2009 | McGuire et al. | 717/176 |
| 7,574,706 B2 * | 8/2009 | Meulemans et al. | 717/176 |
| 7,693,962 B2 | 4/2010 | Serlet et al. | |
| 7,793,099 B2 | 9/2010 | Peterson | |
| 7,937,464 B2 * | 5/2011 | Ruppert et al. | 717/177 |
| 8,176,321 B1 * | 5/2012 | Perry et al. | 717/177 |
| 8,464,249 B1 * | 6/2013 | Goldman et al. | 717/176 |
| 8,762,989 B2 * | 6/2014 | Rowe et al. | 717/176 |
| 2006/0161881 A1 * | 7/2006 | Saad et al. | 717/104 |
| 2009/0064135 A1 * | 3/2009 | Jimmerson | 717/178 |

(Continued)

FOREIGN PATENT DOCUMENTS

| | | |
|---|---|---|
| CN | 101661459 A | 3/2010 |
| CN | 101834885 A | 9/2010 |
| EP | 1626345 A1 | 2/2006 |

OTHER PUBLICATIONS

Visual Studio 2013, "Accessing Local and Remote Data in ClickOnce Applications", 2014 Microsoft, pp. 1-4; <http://msdn.microsoft.com/en-us/library/d8saf4wy.aspx>.*

(Continued)

*Primary Examiner* — Thuy Dao
*Assistant Examiner* — Ben C Wang
(74) *Attorney, Agent, or Firm* — Timothy Churna; Kate Drakos; Micky Minhas (57) ABSTRACT

Files, or other data, may be stored in a package, and the contents of the package may be retrieved incrementally and/or on-demand. In one example, files are packaged into a ZIP file or similar type of package. Additionally, metadata is added to the package that describes the contents of the package at the sub-file level, thereby allowing portions of files to be retrieved by appropriately-configured software. When the package is to be used on a local machine, placeholder files may be created on that machine, which are to be populated by the package's contents at a later time. When a request for data in the package is made, if the data does not reside locally, then a request for the specific data (possibly at the sub-file level) is made, and the placeholder files are populated with the actual package data.

20 Claims, 4 Drawing Sheets

(56) References Cited

U.S. PATENT DOCUMENTS

| | | | |
|---|---|---|---|
| 2009/0089656 A1* | 4/2009 | McAfee et al. | 715/234 |
| 2009/0138481 A1 | 5/2009 | Chatley et al. | |
| 2009/0271442 A1* | 10/2009 | Young et al. | 707/200 |
| 2009/0292980 A1 | 11/2009 | Swineford et al. | |
| 2010/0088297 A1 | 4/2010 | Kiilerich et al. | |
| 2010/0094900 A1* | 4/2010 | Hughes, Jr. | 707/770 |
| 2010/0107153 A1* | 4/2010 | Kwon | 717/175 |
| 2010/0254604 A1* | 10/2010 | Prabhakara et al. | 382/173 |
| 2011/0099516 A1* | 4/2011 | Hughes | 717/176 |
| 2011/0106847 A1* | 5/2011 | Bocharov et al. | 707/770 |
| 2011/0126191 A1* | 5/2011 | Hughes et al. | 717/178 |
| 2011/0209144 A1* | 8/2011 | Rowe et al. | 717/177 |
| 2011/0231838 A1* | 9/2011 | Wookey | 717/178 |
| 2012/0023251 A1* | 1/2012 | Pyle et al. | 709/231 |
| 2013/0047150 A1* | 2/2013 | Malasky et al. | 717/176 |
| 2013/0159994 A1* | 6/2013 | Rowe et al. | 717/177 |
| 2013/0167136 A1* | 6/2013 | Goldman | 717/175 |

OTHER PUBLICATIONS

Fan et al., "Using AUtoMed Metadata in Data Warehousing Environments", 2003 ACM, DOLAP'03, Nov. 7, 2003, New Orleans, Louisiana, pp. 86-93; <http://dl.acm.org/citation.cfm?id=956060.956076&coll=DL&dl=GUIDE&CFID=527242570&CFTOKEN=94290806>.*

Craig Neable, "The .NET Compact Framework", Oct. 2002 IEEE, pp. 84-87; <http://ieeexplore.ieee.org/stamp/stamp.jsp?tp=&arnumber=1158282>.*

"Transfer Files Lightning Fast With FastCopy", Retrieved at << http://lifehacker.com/5060849/transfer-files-lightning-fast-with-fastcopy >>, Oct. 9, 2008, 1 page.

"JSCAPE Secure FTP Server description", Retrieved at << http://www.softpedia.com/get/Internet/FTP-Clients/JSCAPE-Secure-FTP-Server.shtml >>, Aug. 21, 2008, 2 pages.

Search Report in Chinese Patent Application No. 201110437080.3, dated Feb. 20, 2014, 3 pages.

* cited by examiner

ON-DEMAND OR INCREMENTAL REMOTE DATA COPY

BACKGROUND

There are various scenarios where data is retrieved from a remote location to be stored locally. For example, a user may want to download a package of files, such as a ZIP file, or a Windows Imaging File Format (WIM) file, that contains several compressed files. Typically, the user requests to download the package from its source, and then waits for the package to download. When the package has finished downloading, the contents can be extracted.

A problem with this process is that the user typically has to wait for the entire package to download before anything can be done with the package's contents. Thus, a ZIP file might contain dozens of files, of which the user wants to read a single file. In order to read the single file, the user typically has to download the entire ZIP file before the one file that the user wants can be decompressed and viewed. If the ZIP file is large enough, the downloading can take several minutes or hours.

SUMMARY

A package, such as a ZIP or WIM file, may be accessed and downloaded in random order in a way that is transparent to the user, or to the application that is requesting the contents of the package. In one example, files or other types of data are combined into a package to be accessed individually. The "parts" of the package may be individual files, or even portions of a file (sub-files). This metadata may be used to determine which parts of the package are to be downloaded in order to services particular requests for the package's contents.

In order to use a package in a computing environment that supports the use of files, the files in the package may be added to the file system as "sparse" files. Sparse files may be placeholder for contents to be filled in later—e.g., a sparse file may appear by name in a folder, even if the contents of the sparse file do not exist on the storage device that corresponds to the folder. A filter driver may be installed that intercepts requests for files that are part of a package. Thus, if a user or application requests a file that is part of the package, the filter driver may intercept the request to determine whether the contents of the file exist locally. If the contents do exist locally, then the file system is allowed to process the request in the same manner as any other request for a file would be processed.

If the contents do not exist locally, then various components may be used to obtain the contents in a manner that is transparent to the requesting user or application. A package handler uses metadata in the package file (which is available locally to the package handler) to determine what portion of the package is to be obtained in order to service the request. The package handler then uses a transport handler to negotiate the retrieval of that package from the source machine on which the package resides. The transport handler then obtains the requested portion of the package, and provides the raw data corresponding to that portion to the package handler. The package handler then interprets the raw data, and converts it into the data that is being requested by the user or application. The package handler then notifies the appropriate component that the data is ready, and the request to retrieve data from the file is allowed to proceed in the normal manner. For example, if a sparse file has been used to hold a place for data that is to be retrieved from a package, a read of that file may proceed after the sparse file has been populated with actual data from the package.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

In various scenarios, a package containing data is stored remotely, and is retrieved from the remote source for local use. For example, several files may be bundled together in a ZIP or WIM file. These bundles aggregate the files into a single file and may compress them to a smaller size. If one wants to access one of the files that is stored in the ZIP or WIM file, the normal way to do so is to download the entire package and then to use ZIP or WIM software to read and/or extract the files in the ZIP or WIM file. One problem with this process is that it normally involves downloading the entire ZIP or WIM file before any contents of the ZIP or WIM file can be used. Thus, if a user wants to read a single file, the user would normally have to wait for the entire ZIP or WIM file to download, which—depending on size—could take several minutes or even hours. As another example, an application may make use of data that is stored in a ZIP or WIM file, and may want to request just a small amount of data from the ZIP or WIM file. Again, the entire ZIP or WIM file normally has to be obtained in order to extract the requested data. Although ZIP and WIM files are one example of a package that works in this way, there are various other examples of bundled data that is downloaded before individual units of the bundled data can be used (e.g., an install package for a software application).

While some solutions may allow parties to perform certain types of random access to the contents of a ZIP file, these solutions may be specific to a particular domain or runtime, and may distort the accessing party's understanding of the ZIP file. Thus, a ZIP file that is designed to work with such solutions might work only with those solutions, and might not be usable with normal ZIP software. Additionally, such solutions may support random access to a specific type of unit within the ZIP file (e.g., a "unit" could be a single file), but might not support access of information at a finer level of granularity than the file (or might not provide a mechanism to identify the location of specific data at a finer level of granularity than a single file).

The subject matter described herein allows for just-in-time copying of remote resources that are stored in packages. ZIP files and WIM files are examples of such packages, although the techniques described herein may be used with other types of packaged or bundled data. In the subject matter herein, a package (e.g., a ZIP file) may be created with metadata that describes the location of its contents at both the file and sub-file level. Such a ZIP file may be accessed by any ZIP software as if it were a normal ZIP file. However, software may also be created that can use the metadata to retrieve specific portions of the file when those portions are requested. The ZIP file may be stored with this metadata on a machine, such that other machines can access the ZIP file remotely.

Use of the packaged data may be sought on a machine that is remote from the package's storage location. That machine may be configured with various components that facilitate random just-in-time retrieval of the contents of the package. These components may include a filter driver, a job manager, a package handler, and a transport handler. In one example, a request is made to install files from a remotely-stored ZIP file, which results in the creation of local "sparse" files that act as placeholders for contents that has not yet been downloaded. When a request is made for one of these sparse files, the request may be intercepted by a filter driver. If the sparse file has previously been populated with the requested contents, then the filter driver allows the request to proceed. Otherwise, the filter driver passes the request to a job manager. The job manager determines what portion of the file is being requested (e.g., byte offsets ranging from 0x5000 to 0x7000). The job manager sends this request to a package handler, which determines, based on the metadata in the ZIP file, what portion(s) of the ZIP file contain the raw data that will be used to provide the requested content. The package handler then requests that a transport handler obtain these portions of the ZIP file. The transport handler negotiates the actual transfer of the data from the remote source. In general, the role of the package handler is to understand how the raw data in a package corresponds to the requested data, and the role of the transport handler is to understand how to obtain the raw data from a remotely-stored package.

When the transport hander obtains the raw data, it provides the raw data back to the package handler. The package hander uses its knowledge of how the raw package data corresponds to the requested data in order to convert the raw data into the requested data. For example, in the case of the ZIP file, the package handler may decompress the data. Since the package handler understands the nature of the package (e.g., where the metadata in the package is, what the metadata says about correspondence between the packaged data and its raw representation in the package, where the decompression tables are in the package, etc.), the package hander may use this understanding to convert the raw package data into the requested data.

When the package handler has created the requested data, it notifies the job manager that the requested data is available. The job manager may then take appropriate action. For example, in the case where the request for the data was generated by a filter driver that intercepted a request to read a sparse file whose contents had not yet been populated, the job manager may hand the data to the filter driver. The filter driver may then write the data to the sparse file, and then may allow the original pending request for the data to proceed normally. Using this process, data from a package may be obtained at the time that the data is actually being sought on a local device, rather than downloading the entire package to the local device prior to use. This technique may be used in a network computing context to reduce the amount of network traffic and/or wait times associated with package transmission. It may also provide "instant gratification" to the user, since the user does not have to wait for, say, a large install package to download before being able to start installing and using the app. But this technique may also be used in other situations, such as in the situation of a wireless device that obtains connectivity through the cell phone system, where data transmission is relatively slow and downloading an entire package prior to use might not be practical.

In one example, the subject matter herein may fetch data from the package as a background process, even if that data is not being requested. However, the background process may yield to an actual user request, thereby prioritizing the download of the data that is actually being requested for use, while downloading other parts of the package in the background when bandwidth is idle. For example, if package is a suite of applications and a user selects one application from the suite, the job manager may initiate download of all of the files from that application. However, if the user wants to use the application (or, more specifically, a particular function from the application), then the files that are used to make that function work may be downloaded on priority, and downloading the rest of the application files may proceed as a background process.

Figure 1:
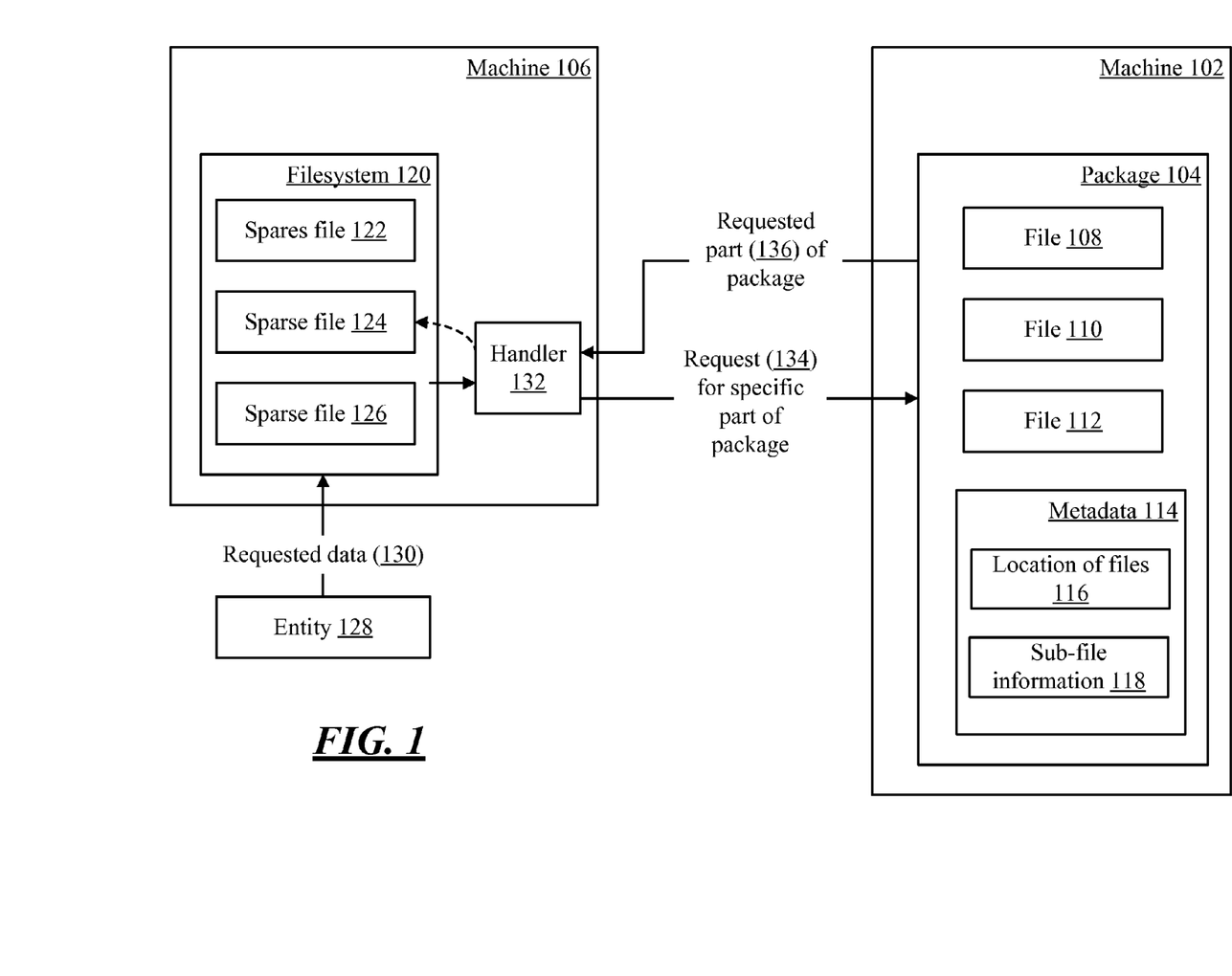
FIG. 1 is a block diagram of an example environment in which parts of a package may be requested.

Turning now to the drawings, FIG. 1 shows an example environment in which parts of a package may be requested. In FIG. 1, two example machines 102 and 106 are shown. Machine 102 stores package 104. Machine 106 is a machine on which use of the contents of package 104 will be used. The use of package 104 may arise on machine 106 through a direct request from a user, through an automatic request made by an application, or in any other way. For example, a user might request a specific file from package 104, or an application might request a specific part of a file in package 104. In one example, package 104 may be a ZIP file, although package 104 could take any appropriate form.

Package 104 may contain several files. In FIG. 1, three example files 108, 110, and 112 are shown. Package 104 may also contain metadata 114, which describes the contents of package 104. For example, metadata 114 may contain information about the locations, within package 104, of the individual files (block 116). As another example, metadata 114 may contain sub-file information (block 118) about the contents of package 104. The sub-file information may indicate where specific parts of the files are located within package 104, where these specific parts encompass less than the normal unit (e.g., one file) supported by the package format. For example, if one wants to read a specific Portable Document Format (PDF) file that is stored in package 104, then it is sufficient to know merely where, in package 104, that PDF file is stored. But if one wants to read a specific page of a PDF, then the sub-file information may indicate where that specific page of the PDF is located, thereby allowing individual pages from package 104 to be retrieved and used.

There may be a filesystem 120 on machine 106. Package 104 may contain files that can be installed in filesystem 120. Thus, if package 104 is a ZIP file that packages several files together, then downloading and unpacking the ZIP file may result installing one or more of the packaged files into filesystem 120. One type of file that may be supported by filesystem 120 is a sparse file, which may contain a large amount of empty space. A sparse file may be used as a placeholder for files that are contained in package 104, but that have not yet been downloaded. Thus, if one who uses machine 106 indicates that he or she wants to use package 104, then sparse files may be created in filesystem 120, where each sparse file corresponds to one of the files stored in package 104. However, at any given time, a sparse file might not contain all of the data stored in one of the packaged files (or might not even contain any of the data stored in one of the packaged files). In the example of FIG. 1, three sparse files 122, 124, and 126 are shown, although there could be any number of sparse files.

When an entity 128 (e.g., a user or application) makes a request 130 to use one of the files (e.g., the sparse files) in filesystem 120, a handler 132 determines whether to obtain information from package 104 stored on machine 102. An example of the structure and nature of handler 132 will be discussed below in connection with FIG. 2. If the requested file already contains the requested data, then that data may be provided to entity 128 directly from local storage on machine 106. If, however, it is determined that the requested data has not yet been obtained, then handler 132 may issue a request 134 for a specific part of the contents of package 104, and machine 102 may respond by providing the requested part 136 to handler 132. Handler 132 may then place the requested part into the appropriate file (after, possibly, processing the raw package data, such as by decompressing it). Handler 132 may then notify filesystem 120 that the requested information is now available, thereby allowing entity 128's request to proceed.

Figure 2:
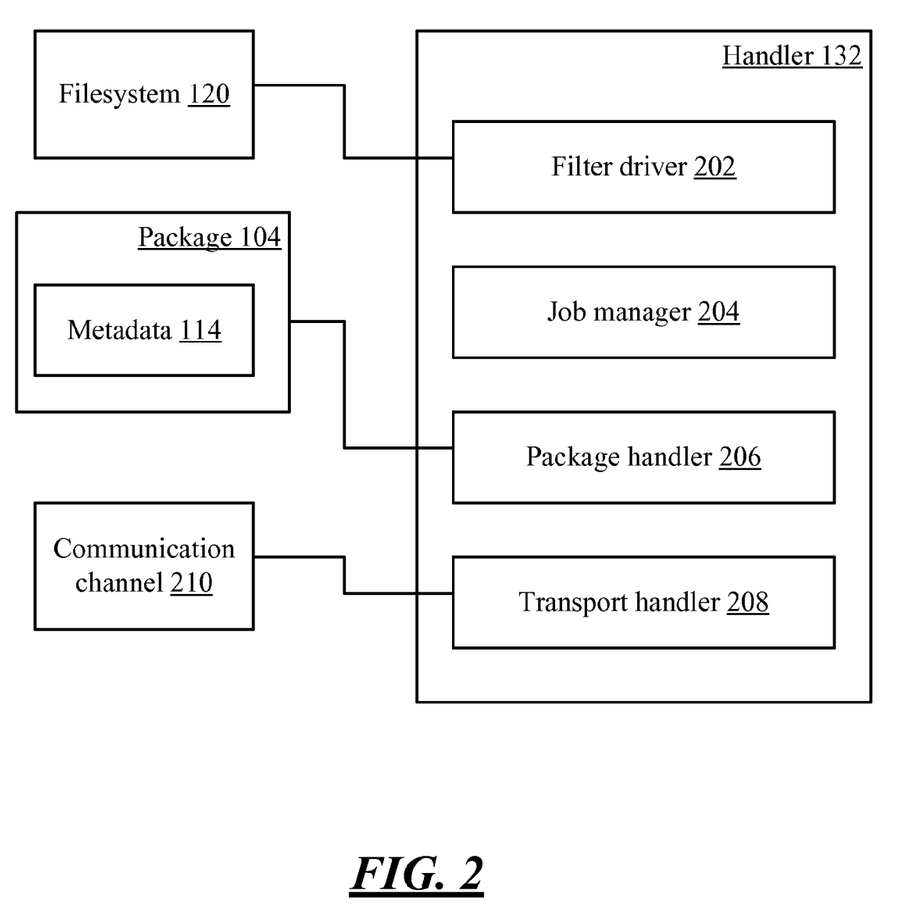
FIG. 2 is a block diagram of an example handler configuration.

Any appropriate type or configuration of components may perform the function of handler 132. However, FIG. 2 shows one example configuration of handler 132.

In the example shown, handler 132 comprises a filter driver 202, a job manager 204, a package handler 206, and a transport handler 208. In general, filter driver 202 interacts with filesystem 120 and intercepts file access requests to determine whether the data to service those requests exists locally, or if the data has to be obtained from a remote package. If the data to service the request exists locally, then filter driver 202 allows the request to proceed through the normal mechanisms through which such a request is processed. Otherwise, filter driver 202 sets in motion the process to obtain the requested part of the file. The act of obtaining the requested part of the file may be performed by the other components—e.g., job manager 204, package handler 206, and transport handler 208.

When it is determined that a portion of a package is to be obtained in order to service a request for a file, the request is made to job manager 204. Job manager 204 receives an indication of what information is being requested, and formulates this request as a particular range of data. For example, if page ten of a PDF file is being requested, job manager 204 may determine that the data that constitutes page ten is stored in bytes 0x5000 to 0x7000 of the PDF file. Based on such a determination, job manager 204 indicates to package handler 206 that bytes 0x5000 to 0x7000 of that file are to be obtained.

Package handler 206 is a component that understands the structure of a package. In particular, package handler 206 may determine what portion of a package (e.g., package 104) contains the material that corresponds to a particular file range. It will be understood that a description such as "bytes 0x5000 to 0x7000" of a particular PDF file identifies only a particular part of the reconstituted file, but does not directly describe where that information is in package 104, how that information can be obtained from package 104, or what other information (e.g., compression tables) will be used to reconstitute that information from package 104. Package handler 206 uses metadata 114 to determine what portions of package 104 are used to obtain and reconstitute the data that is being requested. Package handler 206 may then call on transport handler 208 to retrieve the package data that package handler has determined will be used to reconstitute the requested data. Transport handler 208 may make use of communication channel 210 to obtain the package data. Communication channel 210 may include various hardware components (e.g., a network card, a wired or wireless connection between machines, etc.) and software components (e.g., a network driver, TCP-IP software, etc.) that are used to facilitate communication between machines.

It will be understood that deciding what portion of a package contains particular data is separate from the mechanisms by which that data is actually retrieved. Package handler 206 and transport handler 208 may be separate components that perform these distinct functions.

When transport handler 208 obtains the raw package data, it provides this data to package handler 206. Package handler 206 may then reconstitute the data into the data that job manager 204 has requested. For example, if the raw package data contains data that is in a compressed form, along with a decompression table, then package handler 206 may use the decompression table to decompress the data. When the data has been reconstituted, package handler 206 provides the reconstituted data to job manager 204. Job manager 204, upon learning that the requested data is now available, may place the data into the appropriate file (e.g., by populating the sparse files shown in FIG. 1). (Or, in another example, job manager 204 may cause some other component, such as filter driver 202, to place the data into the appropriate file.) Job manager 204 may notify filter driver 202 that the requested data is now available, and filter driver 202 may then allow the request for that data to proceed.

Figure 3:
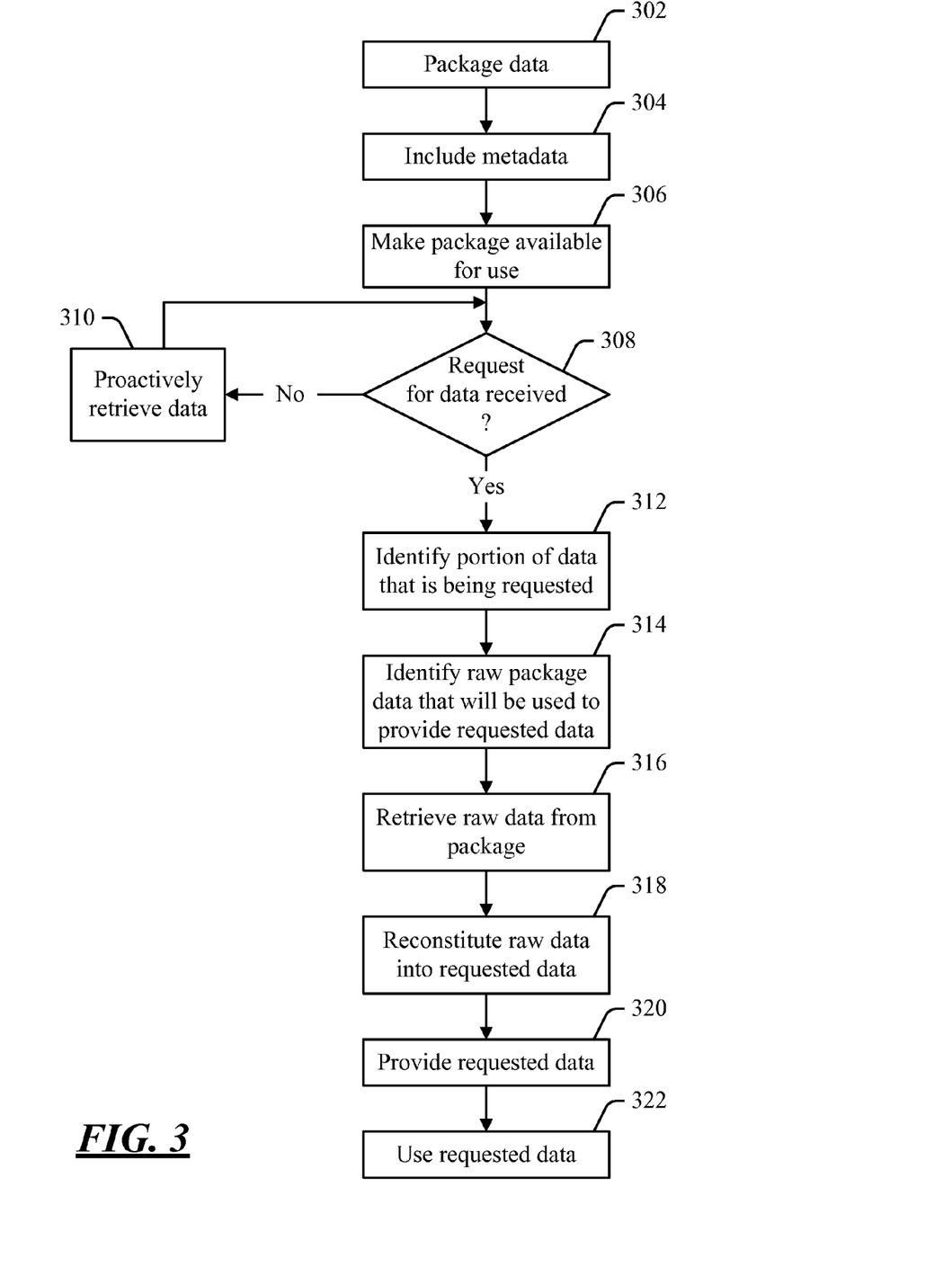
FIG. 3 is a block diagram of an example process in which data packages may be created and used

FIG. 3 shows, in the form of a flow chart, an example process in which data packages may be created and used. Before turning to a description of FIG. 3, it is noted that the flow diagram contained in FIG. 3 is described, by way of example, with reference to components shown in FIGS. 1 and 2, although this process may be carried out in any system and is not limited to the scenarios shown in FIGS. 1 and 2. Additionally, the flow diagram in FIG. 3 shows an example in which stages of a process are carried out in a particular order, as indicated by the lines connecting the blocks, but the various stages shown in this diagram can be performed in any order, or in any combination or sub-combination.

At 302, data may be packaged. In one example, the data is a set of files, and these files may be packaged into a ZIP or WIM file. At 304, metadata may be included in the file. The metadata may describe the locations of the files, as well as containing information at the sub-file level of granularity (e.g., the metadata may specify not merely where the PDF file "a.pdf" is located in the package, but also where, say, page 7 of the PDF file is located). It is noted that this type of metadata might be of significance only to systems that can make use of it, but the inclusion of such metadata does not interfere with the use of the package by other systems. That is to say, a ZIP file that includes extra metadata to identify subfile level portions of the package (or that include metadata that, in some way, facilitates on-demand transfer of portions of the package) does not interfere with whether the ZIP file meets the standard specification of a ZIP file. An appropriate system (e.g., the handler described in FIG. 2) may be able to make use of the metadata. However, if a particular system (e.g., an older ZIP file reader) is unaware of this type of metadata (and is therefore unable to make use of it), the existence of such metadata will not interfere with the system's ability to read the ZIP file. An older system, therefore, may not be able to use the metadata to retrieve portions of the file on-demand, but would still be able to retrieve the files contained in the package.

At 306, the package may be made available for use. For example, the package may be posted on a shared file server, so as to allow others (e.g., the general public, or members of an enterprise community, etc.) to access the package.

At 308, the process waits for a request for the packaged data. For example, there may be a machine (e.g., machine

106, of FIG. 1) on which a user or application may want to make use of the packaged data. If no such request is presently being received (as determined at 308), then the process may proactively retrieve some data from the package (at 310). (Even if no data is presently being retrieved from the package, rather than allowing bandwidth to sit idle data could be retrieved proactively to populate files. In this way, future requests for that data could be served faster.)

If a request for data is being received, then (at 312) the portion of data that is being requested is identified. For example, if the request is for, say, a particular page of a PDF file, then at 312 it is determined what range(s) of bytes in the file contain that page. This decision might be made, for example, by the job manager described above in connection with FIG. 2, but could be made by any appropriate component.

At 314, the raw package data are identified that correspond to the requested byte range. For example, if it is determined that the requested page of a PDF file is located at bytes 0x5000 to 0x7000, then, at 314, it may be determined that this range of bytes in the PDF file corresponds to the range 0x2457BB to 0x247F2A of raw data in the package. This determination might be made, for example, by the package manager described above in connection with FIG. 2, but could be made by any appropriate component.

At 316, the identified raw data is retrieved from the package source. For example, the transport manager described above in connection with FIG. 2 could perform this retrieval, although the retrieval could be performed by any appropriate component.

At 318, the retrieved raw data is reconstituted to produce the requested data. For example, the reconstitution of raw data may involve decompressing the compressed data from a ZIP file or WIM file. At 320, the requested data may be provided to an appropriate component. For example, the requested data may be provided to a file system to be stored in a file. At 322, the requested data may be used. For example, the requested data may be displayed on a display device, communicated to a user, stored in durable, non-transitory storage, or otherwise may be used tangibly in some way.

Although the subject matter herein may be used, in any scenario or context, to support transfer of a package's contents, the following are some example situations in which the subject matter herein may be used.

In one example, the package is an install package (e.g., a package that is used to install an application or other executable component), and the techniques described herein are used to speed up the installation. Normally, an installation package is downloaded in its entirety before the actual installation of the software contained in the package commences. However, the installation process generally makes use of only a few components in the package at a time, so it is possible to download enough components to begin the installation, and then to download other components either at the time they are requested by the installer, or in anticipation of the next action in the installation process.

In another example, techniques described herein may be used to gradually populate files on a local machine. Thus, sparse files (or some other type of placeholder representation of files) may initially be created, and the systems described herein may—over time—retrieve contents from a package and populate the files using those contents. This process may be made transparent to the user, so that, from the user's perspective, files may appear to become available very quickly (e.g., in an imperceptible amount of time).

Additionally, it is noted that the use of the techniques provided herein can be applied to various transport protocols (e.g., hypertext transfer protocol [HTTP], secure hypertext transfer protocol [HTTPS], server message block [SMB], etc.), as well as various package container formats (e.g., ZIP, WIM, etc.). Additionally, the techniques described herein may allow package contents to be accessed at the sub-file level without fragmenting files. In theory, it is possible to break up an individual file into several files that can be accessed separately, thereby providing a form of sub-file-level access. However, fragmenting files in this way may not be compatible with many software solutions (e.g., many ZIP readers), since the general model of package formats such as ZIP assumes that each file packaged into a ZIP appears in the ZIP as a single file; many ZIP readers would not know to put these several files back together at the time of extraction, because they would not be aware that a single files might have been broken into several files for the purpose of packaging those files into a ZIP. The techniques described herein may provide separate metadata that identifies sub-file-level locations within a packaged file, thereby allowing package readers (e.g., ZIP readers) to treat each file in a package as a single file, while allowing readers that are aware of this additional metadata to use the metadata to make sub-file-level access to the files.

Figure 4:
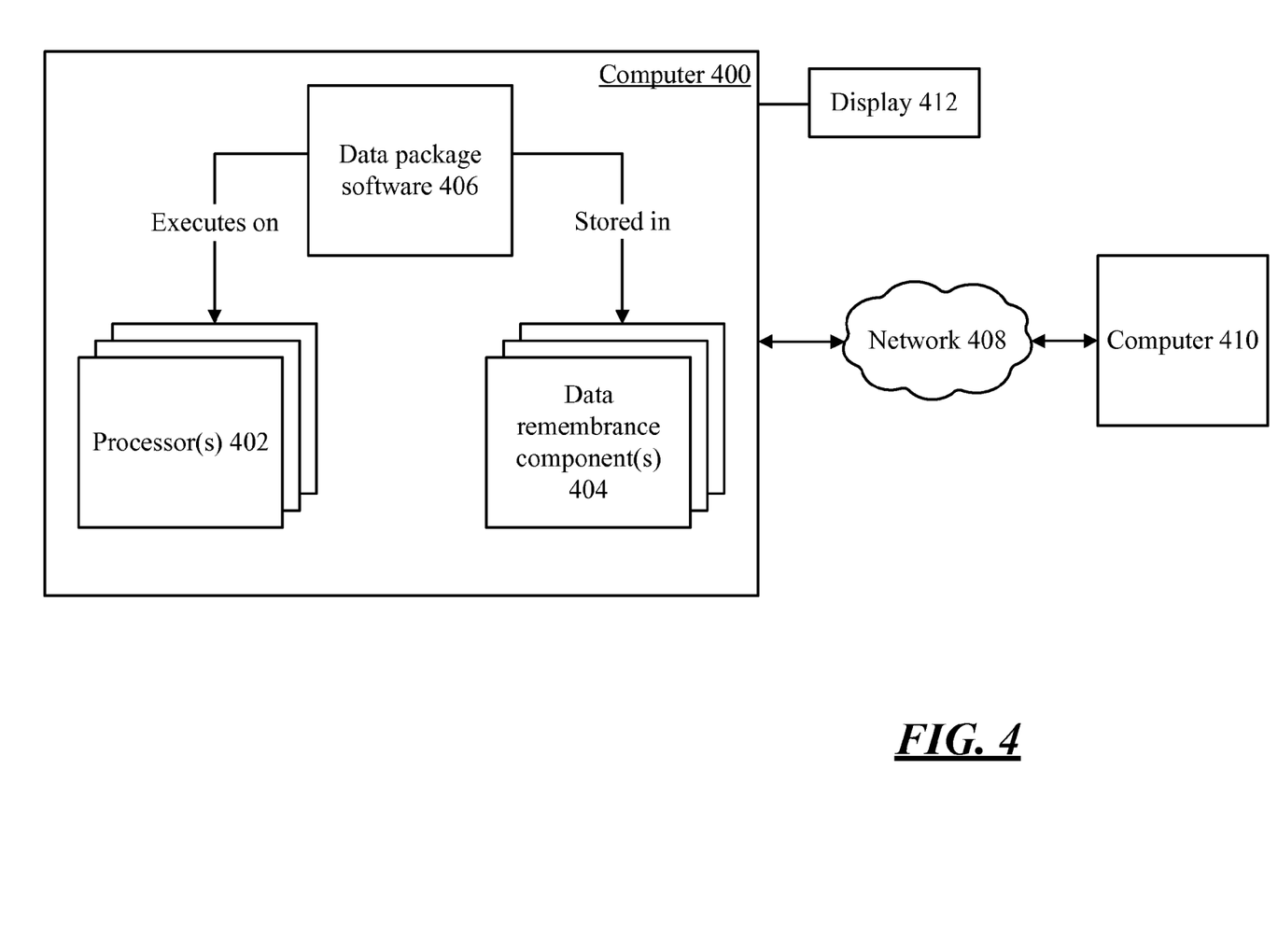
FIG. 4 is a block diagram of example components that may be used in connection with implementations of the subject matter described herein.

While the foregoing has generally been described in terms of retrieving a package from a remote location over a network, the techniques described herein could be used in other configurations. For example, the package could be stored on a DVD or other type of optical FIG. 4 shows an example environment in which aspects of the subject matter described herein may be deployed.

Computer 400 includes one or more processors 402 and one or more data remembrance components 404. Processor(s) 402 are typically microprocessors, such as those found in a personal desktop or laptop computer, a server, a handheld computer, or another kind of computing device. Data remembrance component(s) 404 are components that are capable of storing data for either the short or long term. Examples of data remembrance component(s) 404 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 400 may comprise, or be associated with, display 412, which may be a cathode ray tube (CRT) monitor, a liquid crystal display (LCD) monitor, or any other type of monitor.

Software may be stored in the data remembrance component(s) 404, and may execute on the one or more processor(s) 402. An example of such software is data package software 406, which may implement some or all of the functionality described above in connection with FIGS. 1-3, although any type of software could be used. Software 406 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 4, although the subject matter described herein is not limited to this example.

The subject matter described herein can be implemented as software that is stored in one or more of the data remembrance component(s) 404 and that executes on one or more of the processor(s) 402. As another example, the subject matter can be implemented as instructions that are stored on one or more computer-readable storage media. Tangible media, such as an optical disks or magnetic disks, are examples of storage media. The instructions may exist on non-transitory media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium. It is noted that there is a distinction between media on which signals are "stored" (which may be referred to as "storage media"), and—in contradistinction—media that contain or transmit propagating signals. DVDs, flash memory, magnetic disks, etc., are examples of storage media. On the other hand, wires or fibers on which signals exist ephemerally are examples of transitory signal media.

Additionally, any acts described herein (whether or not shown in a diagram) may be performed by a processor (e.g., one or more of processors 402) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 400 may be communicatively connected to one or more other devices through network 408. Computer 410, which may be similar in structure to computer 400, is an example of a device that can be connected to computer 400, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of packaging and providing data, the method comprising:
   using a processor to perform acts comprising:
      packaging a plurality of files into a package format that supports file level identification of each file within said package but that does not support sub-file level identification of each file within said package;
      including, in said package, metadata that identifies sub-file level portions of contents of said package;
      storing said package;
      making said package available to a machine;
      receiving, from said machine, a request for a first portion of said package that corresponds to a sub-file level portion identified by said metadata;
      identifying said first portion by identifying which file in said package said first portion is in and by using said metadata to identify said first portion; and
      responding to said request by providing said portion.

2. The method of claim 1, wherein said package is either a ZIP file or a WIM file, wherein said plurality of files are stored in said package without breaking any of said files into separate files.

3. One or more computer-readable storage media that store executable instructions to obtain data from a package, wherein the executable instructions, when executed by a computer, cause the computer to perform acts comprising:
   receiving, from an entity, a request for first data from a package, said package being in a format that allows plural units of data to be stored in a single package, each unit in said package being a file, said format supporting identifying of files within said package but not supporting identifying contents of said package at a sub-file level, said package comprising metadata that identifies sub-file portions of contents of said package, said first data being less than a single one of said units;
   identifying which first portion of a first unit in said package contains said first data;
   identifying which second portion of said package is used to create said first portion, said second portion being distinct from said first portion, said second portion being identified using said metadata;
   obtaining said second portion from said package;
   using said second portion to create said first portion; and
   providing said first portion to said entity.

4. The one or more computer-readable storage media of claim 3, wherein each unit of data in said package is a file, wherein said acts further comprise:
   creating, for each file in said package, a sparse file;
   wherein said receiving of said request comprises receiving, from said entity, a request to read a part of a first sparse file, wherein said part is less than all of a file in said package that corresponds to said first sparse file.

5. The one or more computer-readable storage media of claim 3, wherein said package comprises software to be installed, and wherein said acts further comprise:
   beginning installation of said software from said package before all of said package has been downloaded to a machine on which said installation takes place, wherein said entity requests portions of said package when said portions are to be used for said installation.

6. The one or more computer-readable storage media of claim 3, wherein said acts further comprise:
   proactively retrieving portions of said package without receiving a specific request for said portions.

7. The one or more computer-readable storage media of claim 3, wherein said format supports storage of separate files within said package but does not support identification of sub-file portions of said package, and wherein said package comprises metadata that allows sub-file portions of said package to be identified without breaking individual files into plural files.

8. The one or more computer-readable storage media of claim 3, wherein each unit in said package is a file, wherein said package comprises metadata that identifies sub-file portions of contents of said package, wherein said format does not support sub-file identification of portions of said package, and wherein said metadata is included in said package so as not to interfere with use of said package by readers that are unable to use said metadata to identify sub-file portions of said package.

9. The one or more computer-readable storage media of claim 3, wherein said format comprises a ZIP format.

10. The one or more computer-readable storage media of claim 3, wherein said format comprises a WINDOWS Imaging (WIM) format.

11. The one or more computer-readable storage media of claim 3, said second portion being identified based on a range of bytes in said file in which said second portion is located.

12. A system for obtaining data from a package, the system comprising:
   a memory;
   a processor;
   a first component that is stored in said memory and that executes on said processor, wherein said first component receives a request for first data from a package, said package being in a format that allows plural units of data to be stored in a single package, each unit in said package being a file, said format supporting identifying files within said package but not supporting identifying contents of said package at a sub-file level, said package comprising metadata that identifies sub-file portions of contents of said package, said first data being less than a single one of said units, wherein said first component identifies which first portion of a first unit in said package contains said first data;

a second component that is stored in said memory and that executes on said processor, wherein said second component identifies which second portion of said package is used to create said first portion, said second portion being distinct from said first portion, said second portion being identified using said metadata; and a third component that uses a communication channel to obtain said second portion from said package, wherein said second component receives said second portion from said third component, uses said second portion to create said first portion, and provides said first portion to said an entity from which said request is received.

13. The system of claim 12, wherein each unit of data in said package is a file, further comprising:

a filesystem that supports sparse files, wherein said file system creates, for each file in said package, a sparse file, wherein said first component receives a request to read a part of a first sparse file, wherein said part is less than all of a file in said package that corresponds to said first sparse file.

14. The system of claim 12, wherein said package comprises software to be installed, and wherein said system begins installation of said software from said package before all of said package has been downloaded to said system, wherein said entity requests portions of said package when said portions are to be used for said installation.

15. The system of claim 12, wherein said system proactively retrieves portions of said package without receiving a specific request for said portions.

16. The system of claim 12, wherein said format supports storage of separate files within said package but does not support identification of sub-file portions of said package, and wherein said package comprises metadata that allows sub-file portions of said package to be identified without breaking individual files into plural files.

17. The system of claim 12, wherein each unit in said package is a file, wherein said package comprises metadata that identifies sub-file portions of contents of said package, wherein said format does not support sub-file identification of portions of said package, and wherein said metadata is included in said package so as not to interfere with use of said package by readers that are unable to use said metadata to identify sub-file portions of said package.

18. The system of claim 12, wherein said format comprises a ZIP format.

19. The system of claim 12, wherein said package is stored remotely from said system.

20. The system of claim 12, said second portion being identified based on a range of bytes in said file in which said second portion is located.

* * * * *